(12) United States Patent
Kato et al.

(10) Patent No.: US 9,203,998 B2
(45) Date of Patent: Dec. 1, 2015

(54) IMAGE READING DEVICE FOR DETECTING END OF SHEET

(71) Applicants: Tetsuya Kato, Nagakute (JP); Sayaka Taniguchi, Nagoya (JP)

(72) Inventors: Tetsuya Kato, Nagakute (JP); Sayaka Taniguchi, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/169,235

(22) Filed: Jan. 31, 2014

(65) Prior Publication Data

US 2014/0211276 A1  Jul. 31, 2014

(30) Foreign Application Priority Data

Jan. 31, 2013 (JP) ................................. 2013-017091

(51) Int. Cl.
  *H04N 1/04* (2006.01)
  *H04N 1/00* (2006.01)
  *H04N 1/12* (2006.01)

(52) U.S. Cl.
  CPC ............. *H04N 1/00816* (2013.01); *H04N 1/12* (2013.01); *H04N 1/123* (2013.01); *H04N 2201/0081* (2013.01)

(58) Field of Classification Search
  CPC ............................ H04N 1/00816; H04N 1/12
  USPC ......... 358/488, 486, 496, 498, 448, 443, 465, 358/466
  See application file for complete search history.

(56) References Cited

U.S. PATENT DOCUMENTS

| 7,130,090 | B2 * | 10/2006 | Reid | 358/475 |
| 7,327,502 | B2 * | 2/2008 | Sheng | 358/498 |
| 7,672,025 | B2 * | 3/2010 | Luo | 358/486 |
| 8,077,349 | B2 * | 12/2011 | Matsuda et al. | 358/1.9 |
| 8,908,235 | B2 * | 12/2014 | Maeda | 358/449 |
| 2014/0092455 | A1 * | 4/2014 | Iwatsuka | 358/498 |
| 2014/0347712 | A1 * | 11/2014 | Yoneyama et al. | 358/498 |

FOREIGN PATENT DOCUMENTS

| JP | 8-204909 A | 8/1996 |
| JP | 11-41416 A | 2/1999 |
| JP | 2004-120425 A | 4/2004 |
| JP | 2009-16904 A | 1/2009 |

* cited by examiner

*Primary Examiner* — Cheukfan Lee
(74) *Attorney, Agent, or Firm* — Merchant & Gould PC

(57) ABSTRACT

An image reading device starts executing a reading process before a sheet reaches a reading position, and executes the reading process subsequently and repeatedly. A partial image is acquired each time the reading process is executed. Each time one partial image is acquired, the image reading device determines a number of pixels awarded to the one partial image; and determines an intensity awarded to the one partial image. The image reading device decides that at least one of the two successively-acquired partial images corresponds to an end of the sheet when the two partial images satisfy the conditions (A) and (B). Condition (A): the determined number of pixels is changed between the two successively-acquired partial images. Condition (B): the determined intensity is changed between the two successively-acquired partial images.

13 Claims, 10 Drawing Sheets

IMAGE READING DEVICE FOR DETECTING END OF SHEET

CROSS REFERENCE TO RELATED APPLICATION

This application claims priority from Japanese Patent Application No. 2013-017091 filed Jan. 31, 2013. The entire content of the priority application is incorporated herein by reference.

TECHNICAL FIELD

The present invention relates to an image reading device.

BACKGROUND

There is an image reading device that conveys a sheet of document and that reads an image on the sheet at a reading position in a conveyance path by using an image reading unit. The image reading devices of this type include a device that detects, on a read image, positions at which a front end and rear end of the sheet is positioned in the conveying direction, and that uses results of the detection to determine an image size of the sheet in the read image, for example.

SUMMARY

The image reading device may include a sheet holding plate that is so disposed as to face the image reading unit. The following identification images are depicted on the sheet holding plate: a pattern that changes in color along a main scanning direction, a bar code, and a specific design. The image reading device makes a determination as to whether or not image data that the image reading unit has read at a predetermined reading position is the identification image data, thereby detecting the positions of images corresponding to the front end and rear end of the sheet (See Japanese Patent Application Publication No. 2004-120425).

In the conventional image reading device, the problem can arise that, when an image on a sheet is being read at the reading position, the identification image depicted on the sheet holding plate may have an adverse effect on the image read by the image reading unit. Moreover, even if an identification image is depicted on the sheet holding plate, the identification image could get dirty or deteriorate, thereby increasing the possibility of not properly detecting the positions of images corresponding the front end and rear end of the sheet.

In view of the foregoing, it is an object of the invention to provide a technique for detecting positions of front-end and rear-end images on the read image without depicting an identification image on an opposing member such as a sheet holding plate, the front-end and rear-end that corresponds to the leading and trailing edges of the sheet. It is also an object of the invention to provide a technique for preventing the positions of the front-end and rear-end images from being improperly detected in a structure in which the identification image is depicted on an opposing member.

In order to attain the above and other objects, the invention provides an image reading device including a conveying unit, an image reading unit, and a control unit. The conveying unit defines a conveyance path and is configured to convey a sheet along the conveyance path in a conveying direction. The conveyance path includes a reading position. The image reading unit is configured to execute a reading process. The control unit is configured to control the image reading unit to start executing the reading process before the sheet conveyed by the conveying unit reaches the reading position, and control to the reading unit to subsequently and repeatedly execute the reading process. The image reading unit acquires a plurality of partial images successively. Each of the plurality of partial images is acquired each time the image reading unit executes the reading process. The control unit is further configured to determine, each time one partial image is acquired, a number of pixels awarded to the one partial image. The control unit is further configured to determine, each time one partial image is acquired, an intensity awarded to the one partial image. The control unit is further configured to judge, each time one partial image is acquired, whether or not two successively-acquired partial images satisfy at least one of: a condition (A) that the determined number of pixels is changed between the two successively-acquired partial images; and a condition (B) that the determined intensity is changed between the two successively-acquired partial images. The control unit is further configured to decide that at least one of the two successively-acquired partial images corresponds to an end of the sheet in the conveying direction when the two successively-acquired partial images satisfy at least one of the conditions (A) and (B).

According to another aspect, the present invention provides a non-transitory computer readable storage medium storing a set of program instructions executed by a computer, the program instructions including: control an image reading unit to start executing a reading process before a sheet conveyed by a conveying unit reaches a reading position of a conveying path, and to subsequently and repeatedly execute the reading process, the image reading unit acquiring a plurality of partial images successively, each of the plurality of partial images being acquired each time the image reading unit executes the reading process; determine, each time one partial image is acquired, a number of pixels awarded to the one partial image; determine, each time one partial image is acquired, an intensity awarded to the one partial image; judge, each time one partial image is acquired, whether or not two successively-acquired partial images satisfy at least one of: a condition (A) that the determined number of pixels is changed between the two successively-acquired partial images; and a condition (B) that the determined intensity is changed between the two successively-acquired partial images; and decide that at least one of the two successively-acquired partial images corresponds to an end of the sheet in the conveying direction when the two successively-acquired partial images satisfy at least one of the conditions (A) and (B).

BRIEF DESCRIPTION OF THE DRAWINGS

The particular features and advantages of the invention as well as other objects will become apparent from the following description taken in connection with the accompanying drawings, in which.

DETAILED DESCRIPTION

A scanner 1 according to an embodiment of the present invention will be described with reference to FIGS. 1 to 10. In the following description, the left side in FIG. 1 is referred to as a front side (F) of the scanner 1; the front side of the paper surface of FIG. 1 is referred to as a right side (R) of the scanner 1; and the upper side of the paper surface in FIG. 1 is referred to as an upper side (U) of the scanner 1.

(Mechanical Configuration of Scanner)

Figure 1:
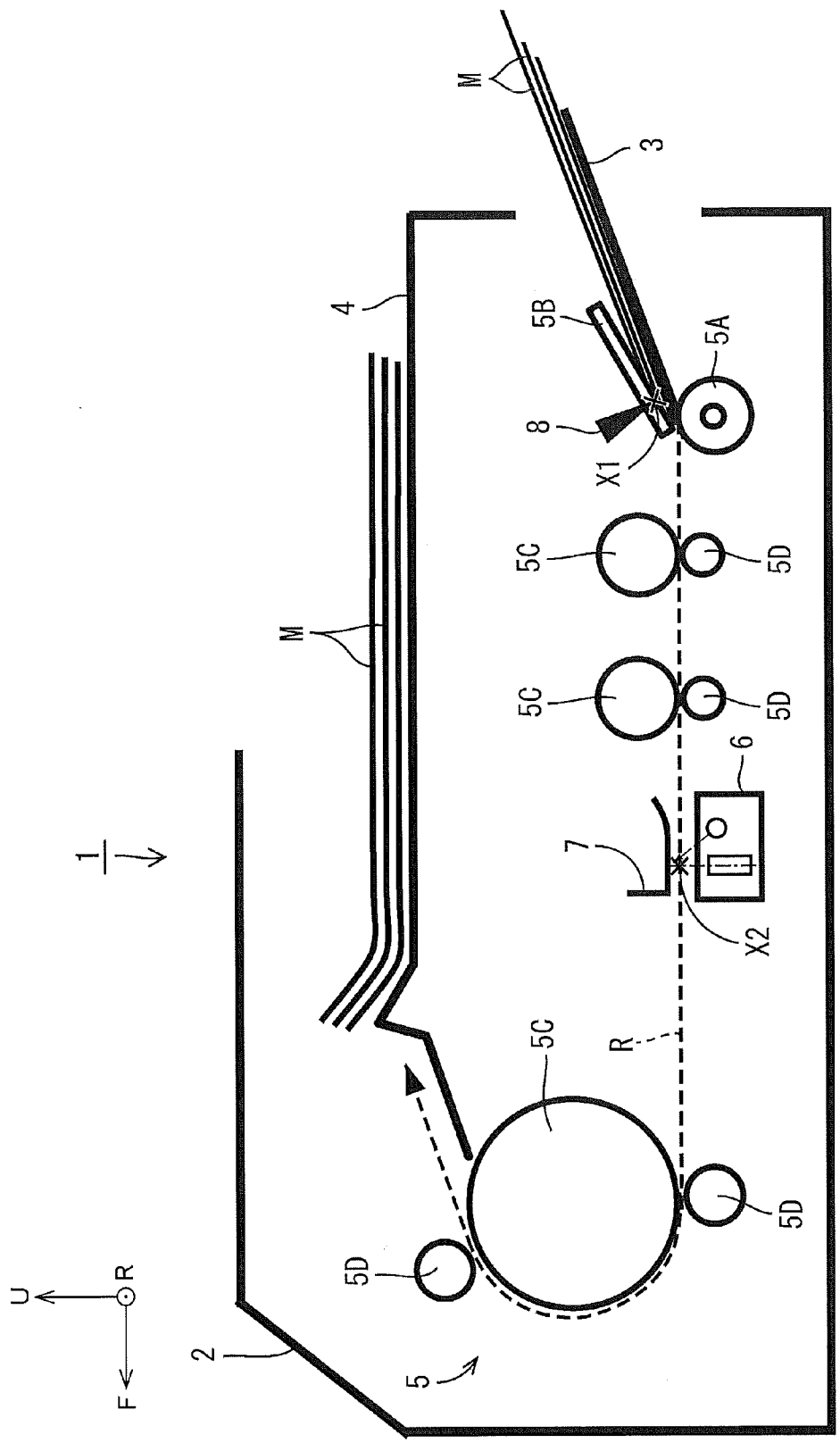
FIG. 1 is an explanatory diagram schematically showing an image reading device according to an embodiment of the invention.

As shown in FIG. 1, the scanner 1 includes a case 2, a sheet tray 3, a discharged-sheet tray 4, an automatic document feeding device (referred to as "ADF," hereinafter) 5, an image reading unit 6, a sheet holding member 7, and a front sensor 8.

More specifically, the sheet tray 3 is provided in an opening section of a rear surface of the case 2. One or a plurality of sheets M of a document can be placed on the sheet tray 3. Incidentally, the sheets M may be made of paper or plastic.

The front sensor 8 is provided on a front end portion of the sheet tray 3. The front sensor 8 is a sheet existence sensor configured to detect whether or not a sheet M exists at a detection position X1on the sheet tray 3. The detection position X1is set on the front end portion of the sheet tray 3. The front sensor 8 is configured to transmit the detection results to a control unit 21 described later. The discharged-sheet tray 4 is provided on an upper surface of the case 2. One or a plurality of sheets M are discharged onto the discharged-sheet tray 4.

The ADF 5 is configured to separate one sheet after another from the plurality of sheets M stacked on the sheet tray 3, and to convey the sheets M along a conveyance path R one by one, and to sequentially discharge the sheets M onto the discharged-sheet tray 4. More specifically, the ADF 5 includes a separation roller 5A, a separation pad 5B, a plurality of conveying rollers 5C, and a plurality of driven rollers 5D, and a guide unit (not shown). The driven rollers 5D are pressed against and driven by the conveying rollers 5C, and the guide unit guides the sheet M.

Figure 3:
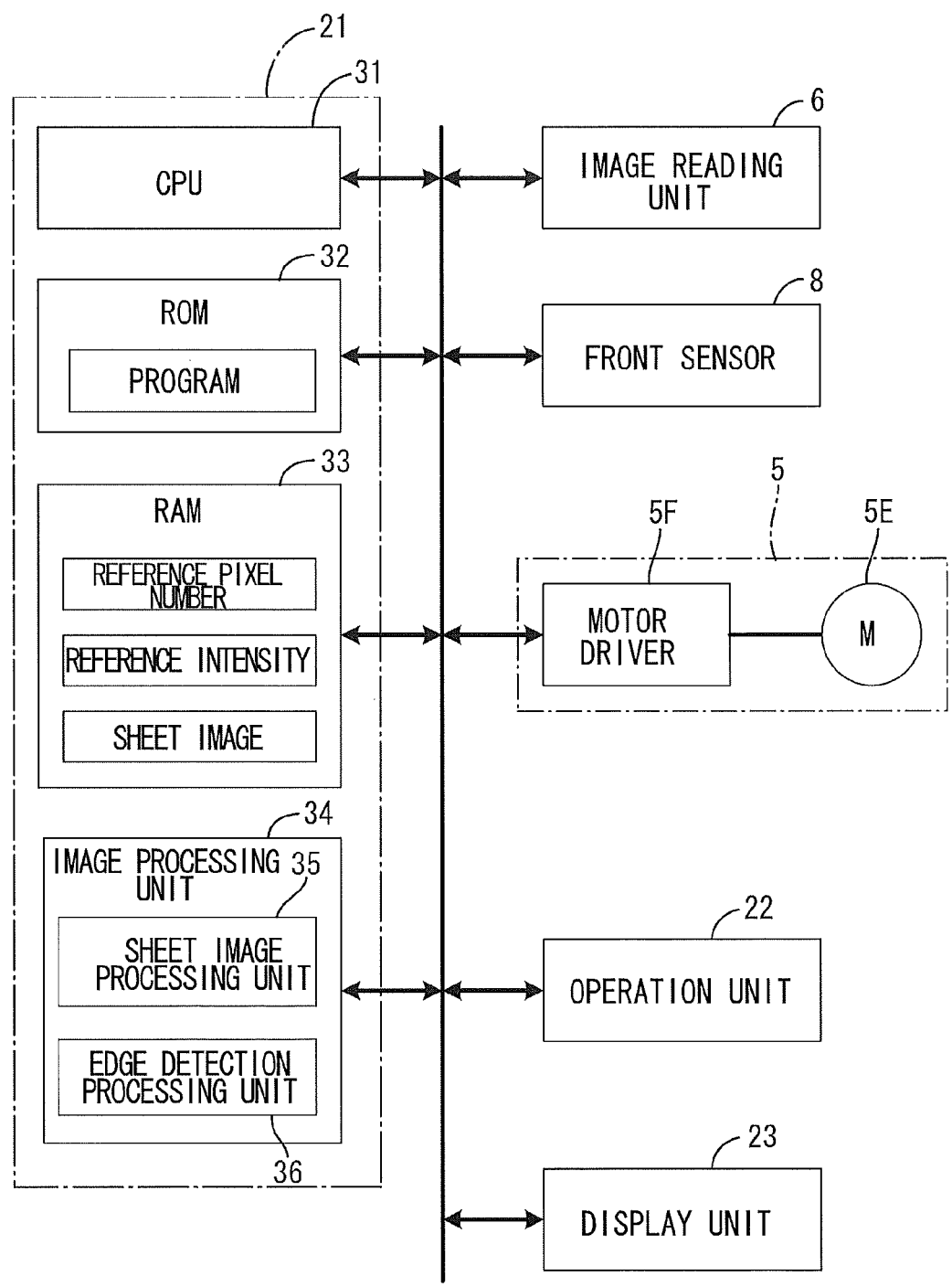
FIG. 3 is a block diagram illustrating an electrical configuration of the image reading device.

The separation roller 5A and the conveying rollers 5C are driven to rotate by a stepping motor 5E (FIG. 3). Accordingly, the separation roller 5A and the separation pad 5B separate one sheet after another from the sheets M on the sheet tray 3, and transfer the sheet M into the conveyance path R. The conveying rollers 5C convey the separated sheet M along the conveyance path R so as to make a U-shape turn, and discharge the sheet M onto the discharged-sheet tray 4. Incidentally, the ADF 5 includes a so-called one-way clutch mechanism, and continues a continuous conveyance operation from when a conveyance start command is received from the control unit 21 until when a conveyance stop command is received. The continuous conveyance operation is a conveyance operation of separating one sheet after another from the sheets M on the sheet tray 3, successively conveying the sheets M at certain intervals along the conveyance path R, and sequentially discharging the sheets M onto the discharged-sheet tray 4.

The image reading unit 6 is a reading device having a CIS (Contact Image Sensor). The image reading unit 6 is configured to sequentially read, from a sheet that is present at a reading position X2 in the conveyance path R, a line image extending along a main scanning direction (left-right direction) perpendicular to the conveying direction. The image reading unit 6 is further configured to acquire a set of data that includes a row of pixels and that corresponds to each line image (referred to as line data, hereinafter) and to transmit the line data to the control unit 21. The control unit 21 uses an AD conversion unit (not shown) to perform an AD conversion on each set of the transmitted line data. Incidentally, the specific configuration of the image reading unit 6, and arrangement of the image reading unit 6 relative to the sheet holding member 7 will be described later. The image reading unit 6 may include a CCD (Charge Coupled Drive Image Sensor) or the like, instead of the CIS.

The sheet holding member 7 is disposed so as to face the image reading unit 6 across the conveyance path R. The sheet holding member 7 has an opposing surface 7A facing the image reading unit 6. The opposing surface 7A is white, for example. The opposing surface 7A is smoother than the sheet M of plain paper, and is higher in reflectance than the sheet M of plain paper. Incidentally, the opposing surface 7A of the sheet holding member 7 may not be white, and instead may be in other colors such as gray.

(Configuration of Image Reading Unit and Document Holding Member)

Figure 2:
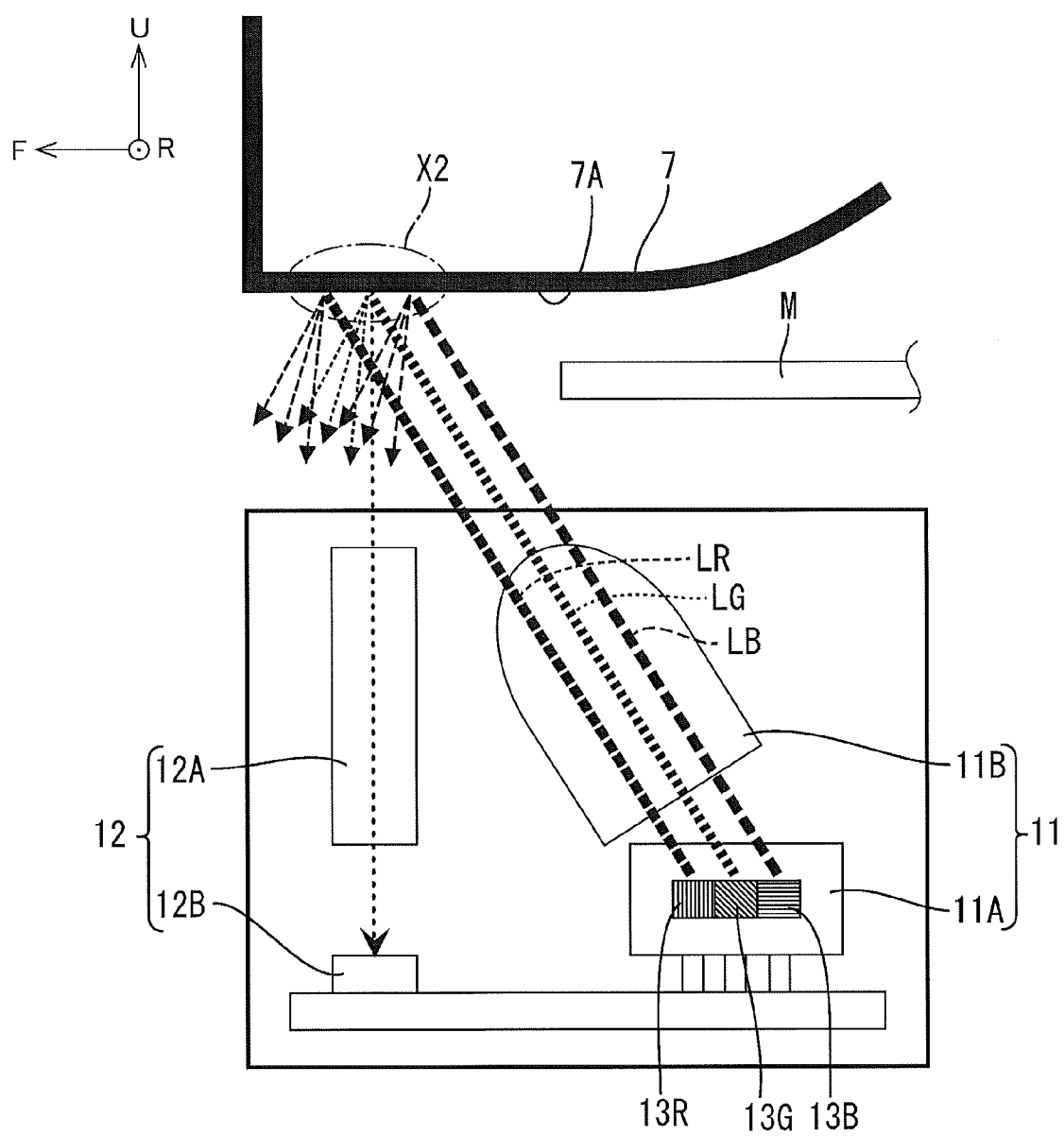
FIG. 2 is an explanatory diagram showing an image reading unit and a sheet holding plate of the image reading device.

FIG. 2 schematically shows the configuration of the image reading unit 8 and the sheet holding member 7. In FIG. 2, optical paths of light LR, LG, and LB of respective different colors are schematically depicted so as to be distinguishable. A range of the reading position X2, or a range irradiated with the light, is depicted large. FIG. 2 shows a situation where the light LR, LG, and LB is reflected by the opposing surface of the sheet holding member 7.

As shown in FIG. 2, the image reading unit 6 includes a light emitting unit 11 and a light receiving unit 12. More specifically, the light emitting unit 11 includes an LED substrate 11A and a light guide body 11B. The light emitting unit 11 is disposed below the sheet holding member 7 and upstream of the sheet holding member 7 in the conveyance direction. On the LED substrate 11A, an R-color LED (light-emitting diode) 13R, a G-color LED 13G, and a B-color LED 13B are disposed at different positions along a front-rear direction (conveying direction defined by the conveyance path R). The R-color LED 13R emits the red (R) light LR, and the G-color LED 13G emits the green (G) light LG, and the B-color LED 13B emits the blue (B) light LB. The light guide body 11B is an optical member that guides the light LR, LG, and LB from the LEDs 13R, 13G, and 13B to the reading position X2.

The light receiving unit 12 includes a light receiving lens 12A and a light receiving substrate 12B. The light receiving lens 12A is an optical member that guides the light from the reading position X2 to the light receiving substrate 12B. On the light receiving substrate 12B, a plurality of light receiving elements, not shown, are arranged side by side in the left-right direction (the main scanning direction). Incidentally, an emission direction of the light LR, LG, and LB is inclined with respect to a direction (up-down direction) in which the light receiving unit 12 faces the opposing surface 7A of the sheet holding member 7.

According to the above configuration, the image reading unit 6 acquires a set of line data by reading at least one of: the opposing surface 7A; and the sheet that is present at the reading position X2. Then, the image reading unit 6 sequentially outputs each set of line data. More specifically, the image reading unit 6 is configured to selectively perform a color reading operation and a monochrome reading operation. The color reading operation is a reading operation of turning the LEDs 13R, 13G, and 13B of the light emitting unit 110N in a time-division manner, using the light receiving unit 12 to receive the light LR, LG, and LB reflected at the sheet that is present at the reading position X2 and/or the opposing surface 7A, and sequentially outputting the line data of each color of RGB as one set of line data. The monochrome reading operation is a reading operation of turning one of the LEDs 13R, 13G, and 13B of the light emitting unit 11 (e.g. LED 13G) ON, using the light receiving unit 12 to receive the light of each color reflected at the sheet that is present at the reading position X2 and/or the opposing surface 7A, and sequentially outputting the line data of one color.

(Electrical Configuration of Scanner)

As shown in FIG. 3, the scanner 1 includes the control unit 21. The control unit 21 is connected to the ADF 5, the image reading unit 6, the front sensor 8, an operation unit 22, and a display unit 23 in such a way that data communication is possible.

The control unit 21 includes a central processing unit (referred to as CPU, hereinafter) 31, a ROM 32, a RAM 33, and an image processing unit 34. The ROM 32 stores the following programs including: an image reading program for performing a reading control process, which is described later; and a program for performing various operations of the scanner 1. The CPU 31 read programs from the ROM 32 and controls each component of the scanner 1 in accordance with the programs read from the ROM 32. The storage media in which the various programs are stored include not only the ROM 32 and the RAM 33, but also CD-ROMs, hard disk devices, and non-volatile memories such as flash memories.

Figure 4:
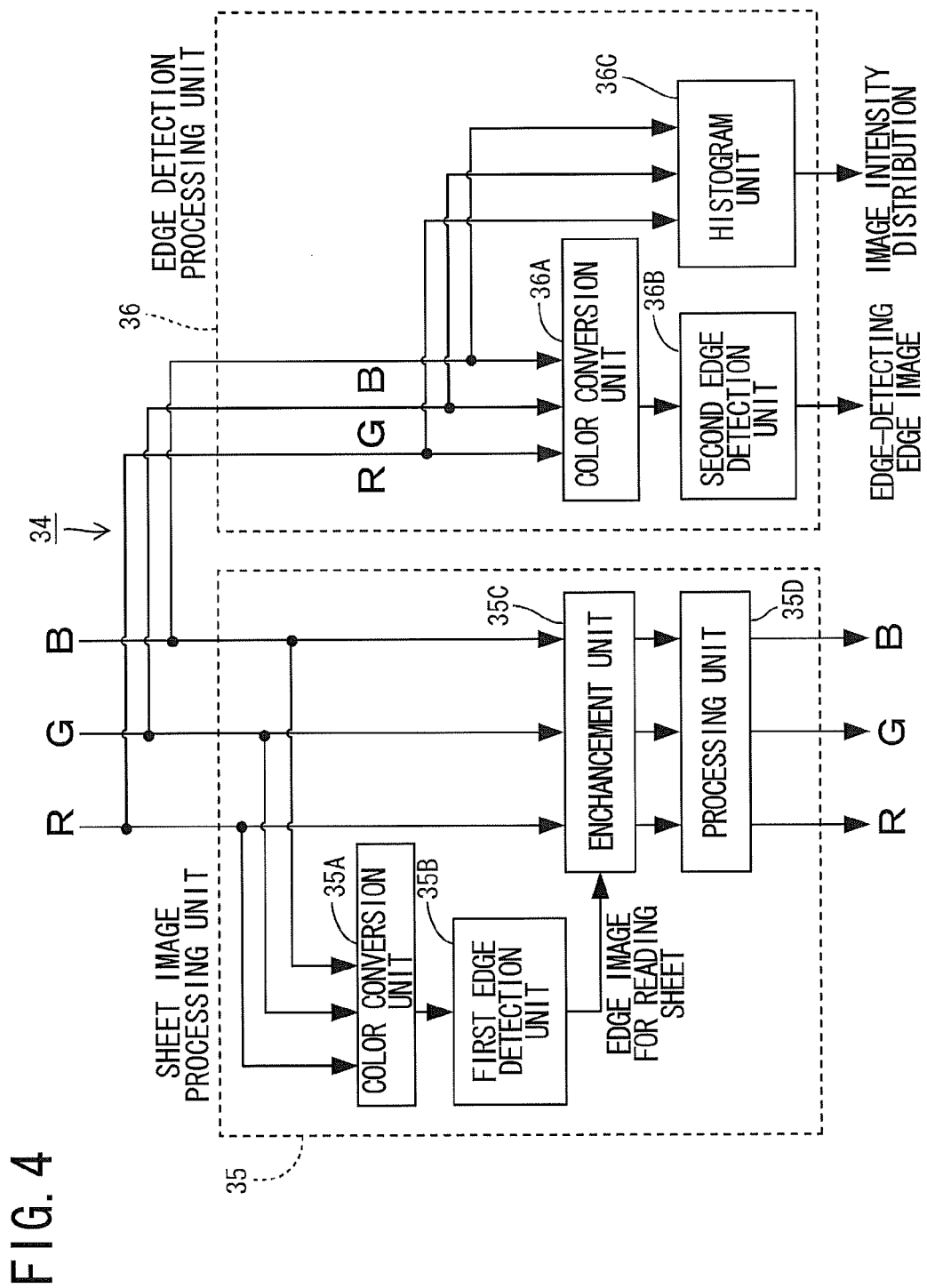
FIG. 4 is a block diagram illustrating an electrical configuration of an image processing unit of the image reading device.
Figure 5:
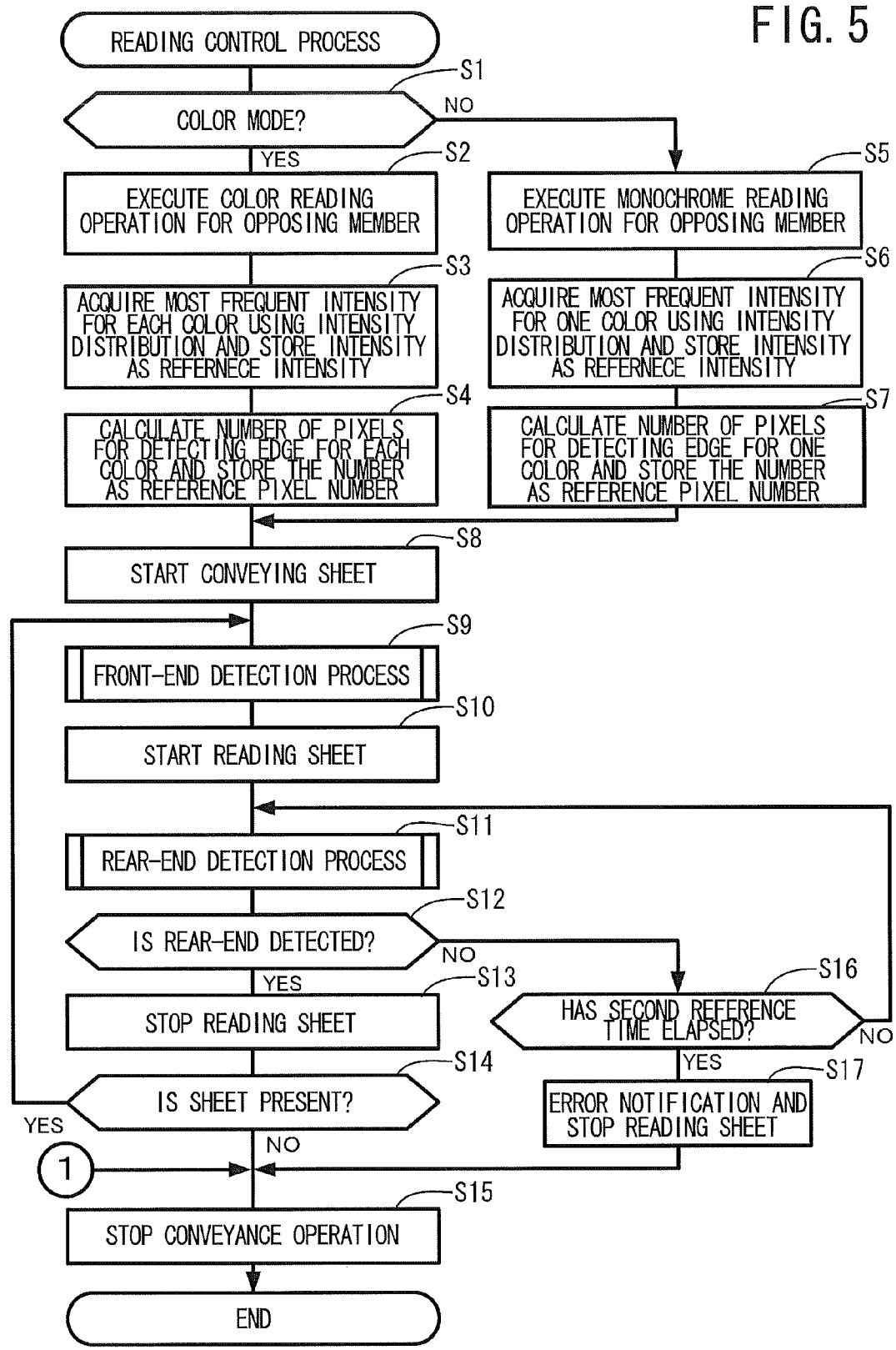
FIG. 5 is a flowchart illustrating steps in a reading control process executed by the image reading device.

The image processing unit 34 is a hardware circuit that is dedicated to image processing. As shown in FIG. 4, the image processing unit 34 includes a sheet image processing unit 35 and an edge detection processing unit 36. The sheet image processing unit 35 is configured to perform a first edge detection process on the line data of each color that is AD-converted by the AD conversion unit to output sheet image data. More specifically, the sheet image processing unit 35 includes a color conversion unit 35A, a first edge detection unit 35B, an enhancement unit 35C, and a processing unit 35D.

The color conversion unit 35A performs color conversion processes, such as the YCbCr conversion or the YIQ conversion, on the line data of each color to generate color-converted data of each color. The color-converted data indicates brightness values and color difference values in each color. The first edge detection unit 35B executes the first edge detection process on the generated color-converted data to detect an edge pixel for correction from an image corresponding to the color-converted data. In the first edge detection process, a variety of commonly-known edge detection methods can be used. Hereinafter, suppose that the first edge detection unit 35B uses an edge detection method using a Laplacian filter, which is a differential filter.

More specifically, the first edge detection unit 35B applies the Laplacian filter coefficient to the color-converted data to detect edge strength of each pixel. If the edge strength of a pixel is greater than or equal to a predetermined first edge detection threshold value TH1, the first edge detection unit 35B recognizes the pixel as the correction edge pixel. The first edge detection threshold value TH1 is a threshold value that enables, to be detected as the edge pixel for correction, a pixel contained in a line-art portion (e.g. characters) of the image corresponding to the color-converted data, for example.

The enhancement unit 35C acquires the AD-converted line data of each color, and data pertaining to the correction edge pixels that has detected by the first edge detection unit 35B; and performs an enhancement process to generate enhanced data by enhancing the line-art portion in the image corresponding to the line data of each color. For example, the processing unit 35D performs a shading correction or a gamma correction on the enhanced data, and outputs the corrected data as the sheet image data.

Figure 8:
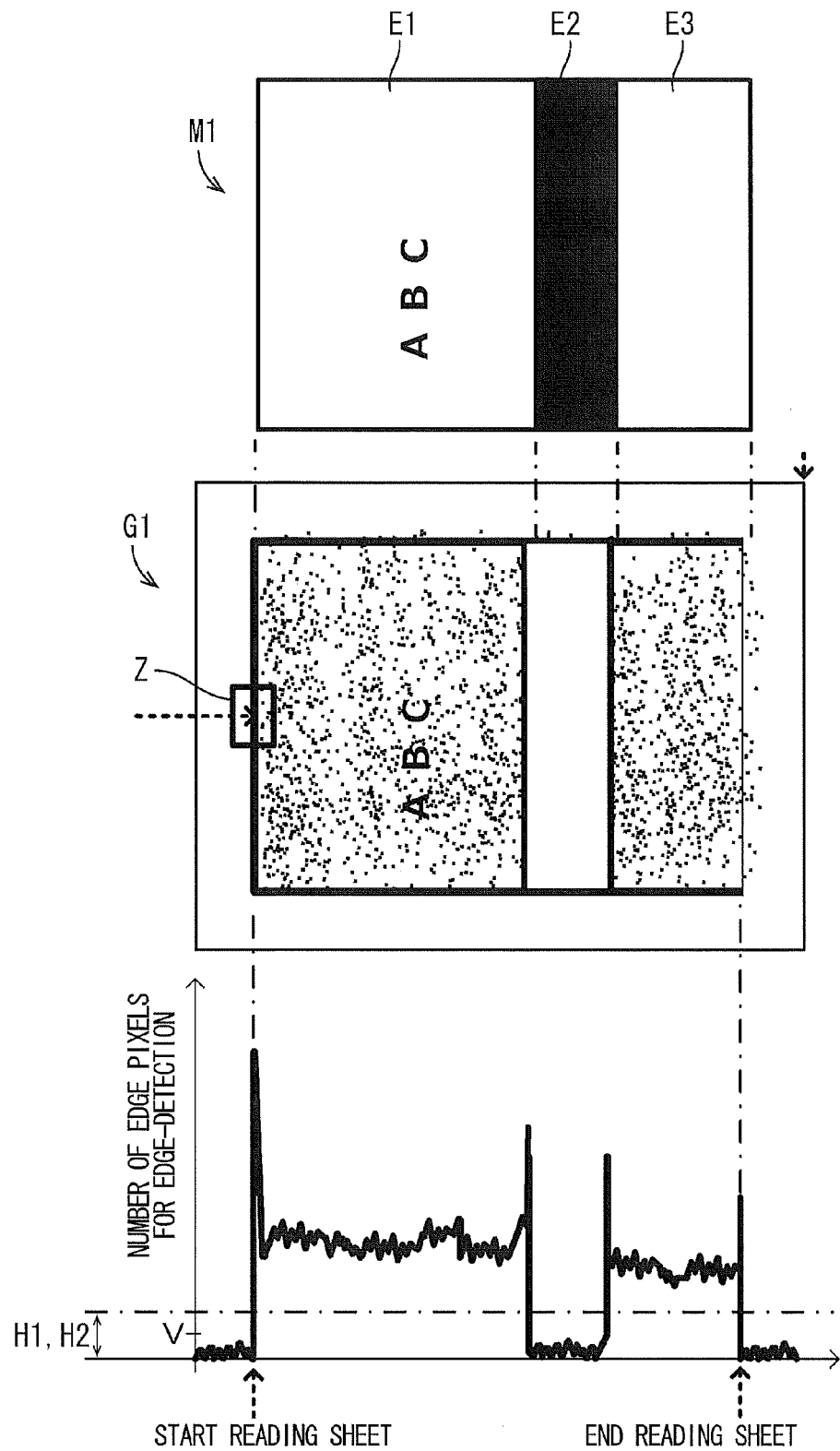
FIG. 8 is an explanatory diagram illustrating a case in where a plain-paper sheet is read.
Figure 9:
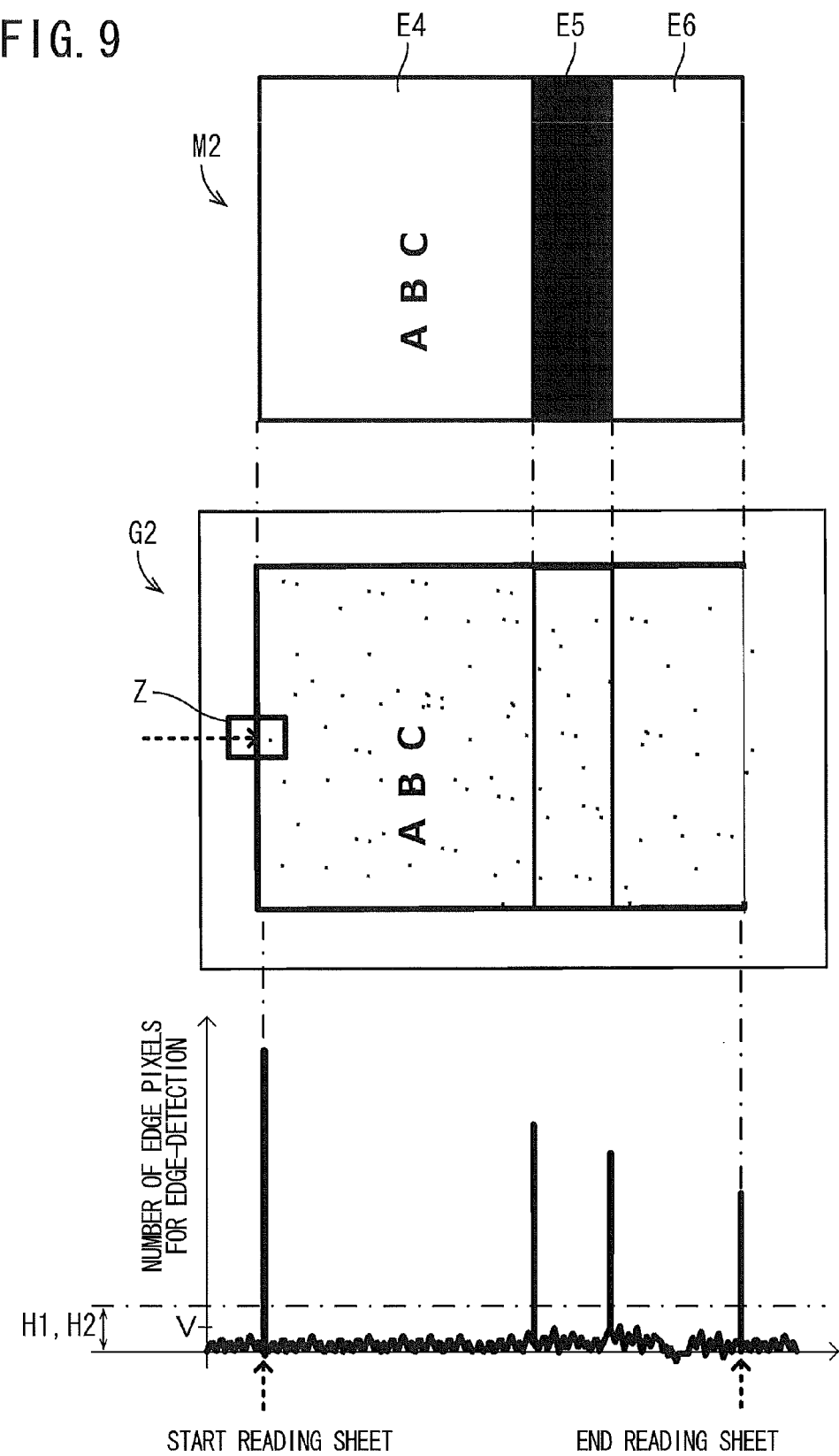
FIG. 9 is an explanatory diagram illustrating a case in where a high-quality paper sheet is read.

The edge detection processing unit 36 is configured to perform a second edge detection process on a part (referred to as partial data, hereinafter) of the AD-converted line data of each color, thereby generating edge pixel data for edge-detection and image intensity distribution data. As shown in FIGS. 8 and 9, the partial data corresponds to a central portion Z of one main scanning line in the read image. More specifically, the edge detection processing unit 36 includes a color conversion unit 36A, a second edge detection unit 36B, and a histogram unit 36C.

The color conversion unit 36A performs color conversion processes, such as the YCbCr conversion or the YIQ conversion, on the partial data of each color, and generates color-converted partial data indicating brightness values and color difference values in each color. The second edge detection unit 36B carries out a second edge detection process on the generated color-converted partial data to detect an edge pixel for edge-detection from an image corresponding to the color-converted partial data. In the second edge detection process, a variety of publicly-known edge detection methods can be used. Hereinafter, suppose that the second edge detection unit 36B uses an edge detection method using the above Laplacian filter.

More specifically, the second edge detection unit 36B applies a Laplacian filter coefficient to the color-converted partial data to detect (calculate) edge strength of each pixel in an image corresponding to the color-converted partial data. If the edge strength of a pixel is greater than or equal to a predetermined second edge detection threshold value TH2, the second edge detection unit 36B recognizes the pixel as the edge pixel for edge-detection. The second edge detection threshold value TH2 is smaller than the first edge detection threshold value TH1; the second edge detection threshold value TH2 is a value that enables a pixel disposed in a bumpy portion of a surface of the plain-paper sheet M to be detected as the edge pixel for edge-detection, for example. In other words, the edge detection processing unit 36 performs edge processing of the image data by performing edge enhancement processing and binarization processing on the image data and determining whether or not the processed image data is equal to or larger than the threshold value set in advance. Moreover, in the present embodiment, the method of detecting the edge by processing the image data is not limited to the method described above.

Figure 10:
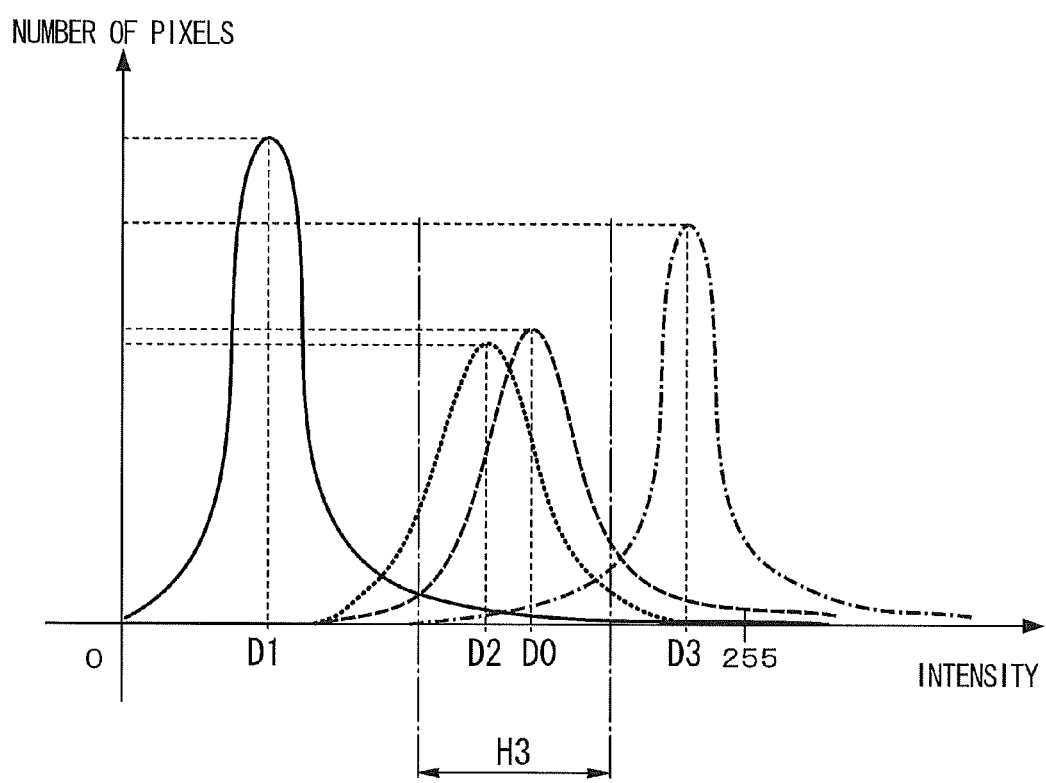
FIG. 10 is a graph showing an intensity distribution.

The histogram unit 36C is configured to acquire, from the partial data of each color, the image intensity distribution in the central portion of the main scanning line to generate the image intensity distribution data (histogram data). The image intensity distribution shows, for a plurality of pixels representing an image formed in the central portion Z as shown in FIG. 10, a correspondence between image densities and a number of pixels indicating each level of image density (intensity). Incidentally, the image intensity is represented by a pixel value ranging from 0 to 255, for example. Hereinafter, suppose that the brightness becomes higher as the pixel value increases.

As shown in FIG. 3, the ADF 5 includes the stepping motor 5E and a motor driver 5F, and rotates and drives the above rollers 5A and 5C. The stepping motor 5E is a well-known motor having a rotor (not shown) and a stator (not shown): the rotor is fixed to a rotation shaft, and the stator is mounted on an outer side of the rotor. The motor driver 5F used to drive the stepping motor 5E is a circuit that drives the stepping motor 5E. The motor driver 5F sequentially supplies a current corresponding to an exciting phase to a coil wound around the stator, thereby accurately rotating the rotor by a constant angle unit. Incidentally, the exciting phase is a phase indicating how the motor driver 5F supplies the current to the coil of the stepping motor 5E. Based on the exciting phase, a rotation position of the stepping motor 5E (position of the rotor) is determined When the CPU 31 inputs a clock signal to the motor driver 5F, the motor driver 5F updates a signal indicating the exciting phase in response to each single pulse of the clock signal and supplies current to the coil based on the signal, thereby rotating the stepping motor 5E by one step (predetermined angle) at a time.

The operation unit 22 includes a plurality of buttons allowing a user to conduct various input operations, such as selection of the color mode or the monochrome mode. The color mode is a mode in which an image is acquired as a color image by reading the sheet M through the color reading operation. The monochrome mode is a mode in which an image is acquired as a monochrome image by reading the sheet M through the monochrome reading operation. The display unit 23 includes a liquid crystal display and a lamp, displaying various setting screens and an operation state of the device.

(Reading Control Process)

After a user selects the color mode or the monochrome mode and inputs a reading command through the operation unit 22, the control unit 21 determines whether or not a sheet M is present on the sheet tray 3 based on the detection results of the front sensor 8. When the control unit 21 determines that the sheet M is present on the sheet tray 3, the control unit 21 starts a reading control process illustrated in FIG. 5. It is possible to detect an edge image of the sheet M and curbing the effects of a difference in surface roughness of the sheets M, by performing the reading control process.

Hereinafter, a plain-paper sheet M1 (see FIG. 8) and a high-quality paper sheet M2 (see FIG. 9), such as glossy paper, will be illustrated as the sheets M that are different in surface roughness. The high-quality paper includes a surface having a surface roughness smoother than a roughness of the plain paper and substantially same as a roughness of the opposing surface 7A of the sheet holding member 7. Upper areas of FIGS. 8 and 9 show the sheets M1 and M2, respectively; the sheets M1 and M2 respectively have first foundation portions E1 and E4 with character portions, solid color portions E2 and E5, and second foundation portions E3 and E6. Middle areas of FIGS. 8 and 9 show edge images G1 and G2 represented by edge pixels for edge-detection in each of main scanning lines that are sequentially output by the edge detection processing unit 36, respectively. Lower areas of FIGS. 8 and 9 show a graph showing a change in the number of edge pixels for edge-detection of each main scanning line.

First, if the CPU 31 determines that the color mode is selected through the operation unit 22 (S1: YES), the CPU 31 controls the image reading unit 6 to start the color reading operation for the opposing surface 7A (S2). As a result, the edge detection processing unit 36 uses line data of each color of RGB that is output by the image reading unit 6, and outputs the edge pixel data for edge-detection and the image intensity distribution data of the central portion Z of one main scanning line in each color (see FIG. 4).

The CPU 31 uses the image intensity distribution data to obtain a most frequent intensity value for each color, and stores the most frequent intensity values in the RAM 33 as data of reference intensity D0 for each color (S3). The most frequent intensity value is an image intensity value (pixel value) indicated by the largest number of pixels among a plurality of pixels representing the central portion Z of the main scanning line. In other words, the most frequent intensity value is a maximum intensity value of an image intensity portion. Then, the CPU 31 calculates the number of edge pixels for edge-detection in the central portion Z for each color by using the edge pixel data for edge-detection, and stores the number in the RAM 33 as a reference pixel number V (S4). Incidentally, the control unit 21 may perform the process S3 and the process S4 in reverse order or in parallel.

If the CPU 31 determines that the monochrome mode is selected through the operation unit 22 (S1: NO), the CPU 31 controls the image reading unit 6 to start the monochrome reading operation for the opposing surface 7A (S5). As a result, the edge detection processing unit 36 uses line data of one color (e.g. B-color) that is output by the image reading unit 6, and outputs the edge pixel data for edge-detection and the image intensity distribution data at the central portion Z in one main scanning line (See FIG. 4).

The CPU 31 acquires the most frequent intensity value for one color by using the image intensity distribution data output by the edge detection processing unit 36, and stores the most frequent intensity value in the RAM 33 as data of reference intensity D0 (S6). Then, the CPU 31 uses the edge pixel data for edge-detection, calculates the number of edge pixels for edge-detection in the central portion Z for one color, and stores the number in the RAM 33 as a reference pixel number V (S7). Incidentally, the control unit 21 may perform the process S6 and the process S7 in reverse order or in parallel. After storing the data of reference intensity D0, the CPU 31 activates the ADF 5 to start conveying the sheet M (S8) and performs a front-end detection process illustrated in FIG. 6 (S9).

(Front-End Detection Process)

Figure 6:
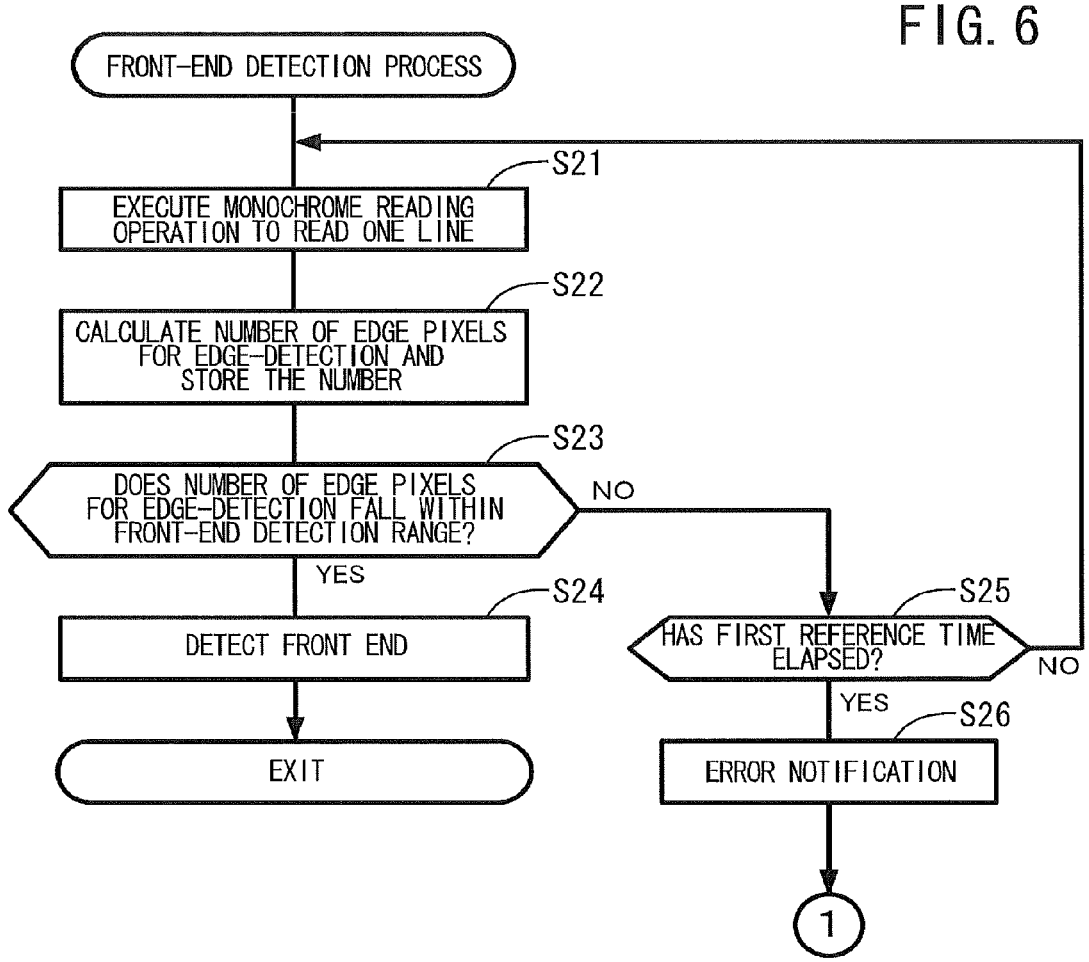
FIG. 6 is a flowchart illustrating steps in a front-end detection process in the reading control process.
Figure 7:
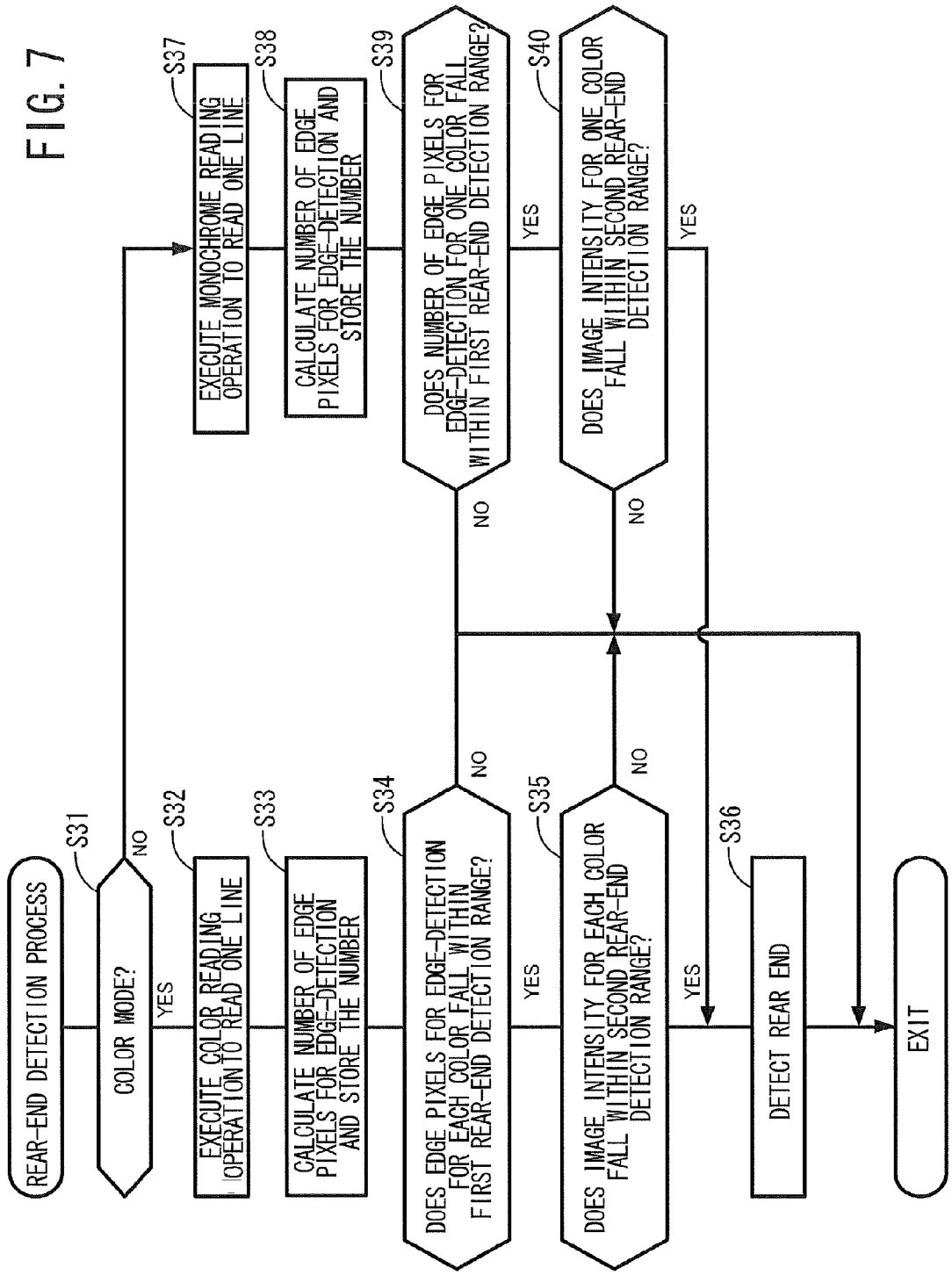
FIG. 7 is a flowchart illustrating steps in a rear-end detection process in the reading control process.

As shown in FIG. 6, the CPU 31 controls the image reading unit 6 to perform the monochrome reading operation to read an image of one main scanning line worth (S21) even when the color mode or the monochrome mode is being selected. The edge detection processing unit 36 uses the line data of one color that is output by the image reading unit 6, and then outputs the edge pixel data for edge-detection for the central portion of one main scanning line (see FIG. 4). The CPU 31 uses the edge pixel data for edge-detection to calculate the number of edge pixels for edge-detection from the central portion for one color, and stores the number in the ROM 33 (S22).

Then, the CPU 31 makes a determination as to whether the number of edge pixels for edge-detection calculated has changed in such a way as to move out of a front-end detection range H1 from the inside of the front-end detection range H1 (S23). The front-end detection range H1 is a range containing the reference pixel number V; the front-end detection range H1 is preferably a range whose center value is the reference pixel number V, for example. At the onset of the front-end detection process, the sheet M has not yet reached the reading position X2; the image reading unit 6 therefore performs the monochrome reading operation for the opposing surface 7A. Accordingly, the number of edge pixels for edge-detection calculated is substantially equal to the reference pixel number V; the CPU 31 determines that the number of edge pixels for edge-detection calculated has not changed in such a way as to move out of the front-end detection range H1 from the inside of the front-end detection range H1 (S23: NO).

Then, if the CPU 31 determines that the number of edge pixels for edge-detection calculated has not changed in such a way as to move out of the front-end detection range H1 from the inside of the front-end detection range H1 (S23: NO), the CPU 31 determines whether or not a first reference time has elapsed since the start of the conveyance operation. The first reference time is set long enough for the front end of the sheet M to be conveyed from the sheet tray 3 to the reading position X2. If the CPU 31 determines that the first reference time has not yet passed since the start of the conveyance operation (S25: NO), then the CPU 31 returns to S21.

When the conveyance-direction front end (simply referred to as front end, hereinafter) of the sheet M has reached the reading position X2, there is a great change in the number of edge pixels for edge-detection as shown in the lower areas of FIGS. 8 and 9. Accordingly, the CPU 31 determines that the number of edge pixels for edge-detection has changed in such a way as to move out of the front-end detection range H1 from the inside of the front-end detection range H1 (S23: YES). Then, the CPU 31 recognizes the position where the change has occurred on the read image as the position (a front-end image) in an image corresponding to a front-end (leading end) of the sheet M (S24), and ends the front-end detection process and proceeds to S10 of FIG. 5. In other words, the CPU 31 decides that the two successively-acquired partial images correspond to the front-end of the sheet M based on the numbers of edge pixels. The numbers of edge pixel is awarded to the corresponding line image.

According to the configuration of the scanner 1, the position of the front-end of the sheet M can be easily detected by using edge pixels for edge-detection, compared with the position of a rear-end image corresponding to a rear end (trailing end) of the sheet M. That is, as shown in the lower areas of FIGS. 8 and 9, the number of edge pixels for edge-detection significantly changes not only when the front end and rear end of the sheet M have reached the reading position X2, but also when the character portion or solid color portion on the sheet M has reached the reading position X2. Hereinafter, a position where the number of edge pixels for edge-detection significantly changes is referred to as an edge-number change position. The position of the front-end of the sheet M emerges as an edge-number change position of the front portion on the read image. However, the position of the rear-end of the sheet M varies according to whether or not a character portion exists on the sheet M; it is unclear what number edge-number change position the position of the rear-end image is.

Moreover, as described above, in the image reading unit 6, the light emitting unit 11 is so disposed as to emit the light toward the reading position X2 from a diagonally rear side in the conveying direction of the sheet M (See FIG. 2). Therefore, part of the light from the light emitting unit 11 is blocked by the front-side surface of the sheet M, resulting in a relatively large drop in the amount of light received by the light receiving unit 12. Accordingly, as shown in the lower areas of FIGS. 8 and 9, the number of edge pixels for edge-detection significantly changes not only when the front end of the plain-paper sheet M1 has reached the reading position X2 but also when the front end of the high-quality paper sheet M2 has reached the reading position X2.

Therefore, when the number of edge pixels for edge-detection calculated has changed in such a way as to move out of the front-end detection range H1 from the inside of the front-end detection range H1, the control unit 21 recognizes the position where the change has occurred on the read image as the position corresponding to the front-end image of the sheet M, regardless of whether or not conditions for image intensity are satisfied. Thus, a processing load for front-end detection can be reduced compared with a structure in which the position corresponding to the front-end of the sheet M is detected based on both the edge-detecting edge image and the conditions for image intensity.

Returning to FIG. 6, if the CPU 31 determines that the number of edge pixels for edge-detection calculated has not changed in such a way as to move out of the front-end detection range H1 after the first reference time has elapsed since the start of the conveyance operation of S8 (S23: NO, and S25: YES), then the CPU 31 recognizes the occurrence of an error in which the front end of the sheet M does not reach the reading position X2 as the sheet M gets jammed in the middle of the conveyance path R or as any other trouble has occurred, for example. Then, the CPU 31 notifies an external section of the error (S26). The notification may be issued by various notification methods, such as displaying of error information on the display unit 23 or outputting of sound from a sound outputting device not shown in the diagrams. After the error notification, the CPU 31 proceeds to S15 of FIG. 5; regardless of whether or not a sheet M exists on the sheet tray 3, the CPU 31 stops the conveyance operation of the ADF 5, and ends the reading control process.

After detecting the position of the read image corresponding to the front-end of the sheet M (S24 of FIG. 6), the CPU 31 starts executing the reading process to read the image on the sheet M (S10). More specifically, the CPU 31 sequentially stores, in the RAM 33, the sheet image data that is output from the sheet image processing unit 35 in synchronization with the detection timing when the position corresponding to the front-end of the sheet M is detected. In other words, the detection of the sheet image processing unit 35 and edge detection processing unit 36 are executed in the parallel. After the start of the reading of the sheet, the CPU 31 starts a rear-end detection process illustrated in FIG. 7 (S11).

(Rear-end detection process)

If the CPU 31 determines that the color mode is being selected (S31: YES), the CPU 31 controls the image reading unit 6 to perform the color reading operation to read an image of one main scanning line worth (S32). The edge detection processing unit 36 therefore uses line data output by the image reading unit 6 for each color, and then outputs the edge pixel data for edge-detection and image intensity distribution data of the central portion Z of one main scanning line (see FIG. 4). The CPU 31 uses the edge pixel data for edge-detection to calculate the number of edge pixels for edge-detection in the central portion Z for each color, and stores the number in the RAM 33 (S33).

Then, the CPU 31 makes a determination, for all colors, as to whether the calculated number of edge pixels for edge-detection has changed in such a way as to move into a first rear-end detection range H2 from the outside of the first rear-end detection range H2 (S34). The first rear-end detection range H2 is a range containing the reference pixel number V; the first rear-end detection range H2 is preferably a range whose center value is the reference pixel number V, for example. The first rear-end detection range H2 may be the same range as the front-end detection range H1, or be a different range from the front-end detection range H1. If the CPU 31 determines that the number of edge pixels for edge-detection has not changed in such a way as to move into the first rear-end detection range H2 from the outside (S34: NO), then the CPU 31 proceeds to S12 of FIG. 5, and determines that the position of a rear-end image of the sheet M is not detected (S 12: NO).

Then, if the CPU 31 determines that a second reference time has not yet elapsed since the start of the conveyance operation of S8 (S16: NO), then the CPU 31 returns to S11. The second reference time is set long enough for the rear end of the sheet M to be conveyed from the sheet tray 3 to the reading position X2. Incidentally, the second reference time may be set long enough for the rear end of the sheet M to reach the reading position X2 after the position of the front-end image is detected.

If the CPU 31 determines that the number of edge pixels for edge-detection has changed in such a way as to move into the first rear-end detection range H2 from the outside (S34: YES), then the CPU 31 uses the image intensity distribution data to make a determination, for each of three colors, as to whether the image intensity has changed in such a way as to move into a second rear-end detection region H3 from the outside (S35). The second rear-end detection range H3 is a range containing the reference intensity D0; the second rear-end detection range H3 is preferably a range whose center value is the reference intensity D0, for example.

If the CPU 31 determines, for at least one of three colors, that the image intensity has not changed in such a way as to move into the second rear-end detection range H3 from the outside (S35: NO), the CPU 31 proceeds to S12 of FIG. 5. If the CPU 31 determines, for each of three colors, that the image intensity has changed in such a way as to move into the second rear-end detection range H3 from the outside (S35: YES), the CPU 31 recognizes the position where the change has occurred on the read image as the position corresponding to the rear-end of the sheet M (S36), and ends the rear-end detection process. Then, the CPU 31 proceeds to S12 of FIG. 5, and determines that the position corresponding to the rear-end of the sheet M has been detected (S12: YES).

After the position of the rear-end image is detected, the CPU 31 ends the reading operation of the image reading unit 6 and stops the image processing unit 34, and stops reading the sheet (S13) and determines whether or not a sheet M is present on the sheet tray 3 (S14). If the CPU 31 determines that a sheet M is present on the sheet tray 3 (S14: YES), the CPU 31 returns to S9. If the CPU 31 determines that there is no sheet M on the sheet tray 3 (S14: NO), the CPU 31 stops the conveyance operation of the ADF 5 after the last sheet M that has been read is discharged onto the discharged-sheet tray 4 (S15), and ends the reading control process.

If the CPU 31 determines that the rear-end image is not yet detected even after the second reference time has passed since the start of the conveyance operation of S8 (S12: NO, and S16: YES), then the CPU 31 recognizes the occurrence of an error in which the rear end of the sheet M does not reach the reading position X2 as the sheet M gets jammed in the middle of the conveyance path R or as any other trouble has occurred, for example. Then, the CPU 31 notifies the external section of the error and stops reading the sheet (S 17), and proceeds to S15.

If the CPU 31 determines that the monochrome mode is being selected (S31: NO), the CPU 31 instructs the image reading unit 6 to perform the monochrome reading operation to read an image of one main scanning line (S37). The edge detection processing unit 36 therefore uses line data output by the image reading unit 6 for one color, and then outputs the edge pixel data for edge-detection and image intensity distribution data of the central portion Z of one main scanning line (See FIG. 4). The CPU 31 uses the edge pixel data for edge-detection to calculate the number of edge pixels for edge-detection in the central portion Z for one color, and stores the number in the RAM 33 (S38).

If the CPU 31 determines that, for one color, the number of edge pixels for edge-detection calculated has not changed in such a way as to move into the first rear-end detection range H2 from the outside of the first rear-end detection range H2 (S39: NO), then the CPU 31 proceeds to S12 of FIG. 5, and determines that the position of the rear-end image corresponding to the rear end of the sheet M is not detected (S12: NO). If the CPU 31 determines that, for one color, the number of edge pixels for edge-detection calculated has changed in such a way as to move into the first rear-end detection range H2 from the outside (S39: YES), and if the CPU 31 determines that, for one color, the image intensity has not changed in such a way as to move into the second rear-end detection range H3 from the outside (S40: NO), then the CPU 31 proceeds to S12 of FIG. 5, and determines that the position corresponding to the rear-end of the sheet M is not detected (S12: NO). If the CPU 31 determines that, for one color, the image intensity has changed in such a way as to move into the second rear-end detection range H3 from the outside of the second rear-end detection range H3 (S40: YES), then the CPU 31 proceeds to S36.

(In the Case of Plain-Paper Document Sheet)

For example, the first foundation portion E1 would pass through the reading position X2 after the front end of the plain-paper sheet M1 reaches the reading position X2. The surface of the foundation portions E1 and E3 of the plain paper is rougher than the opposing surface 7A of the sheet holding member 7. Therefore, as shown in the lower area of FIG. 8, after the front end of the sheet M1 reaches the reading position X2, the number of edge pixels for edge-detection remains a value apart from the reference pixel number V. Accordingly, the CPU 31 determines that the number of edge pixels for edge-detection calculated has not changed in such a way as to move into the first rear-end detection range H2 from the outside (S34 or S39: NO), and does not detect the position of the rear-end image. Incidentally, as shown in FIG. 10, suppose that the image intensity D2 of the foundation portions E1 and E3 of the sheet M1 approximates to the reference intensity D0, and is within the second rear-end detection range H3.

Then, when the front end of the solid color portion E2 has reached the reading position X2, as shown in the middle and lower areas of FIG. 8, the number of edge pixels for edge-detection in an edge image of the solid color portion E2 is relatively small, and approximates to the reference pixel number V. Therefore, as shown in the lower area of FIG. 8, when the solid color portion E2 of the sheet M1 has reached the reading position X2, the CPU 31 determines that the number of edge pixels for edge-detection calculated has changed in such a way as to move into the first rear-end detection range H2 from the outside (S34 or S39: YES). However, as shown in FIG. 10, the image intensity D1 of the solid color portion E2 is vastly different from the reference intensity D0. Therefore, the CPU 31 determines that the image intensity has not changed in such a way as to move into the second rear-end detection range H3 from the outside (S35 or S40: NO), and does not detect the position of the rear-end image.

As the front end of the second foundation portion E3 reaches the reading position X2, as shown in the lower area of FIG. 8, the number of edge pixels for edge-detection is changed from a value approximate to the reference pixel number V to a value apart therefrom. The number of edge pixels for edge-detection has changed so as to move out of the first rear-end detection range H2 from the inside of the range H2. That is, the CPU 31 determines that the number of edge pixels for edge-detection has not changed in such a way as to move into the first rear-end detection range H2 from the outside (S34 or S39: NO), and does not detect the position of the rear-end image.

As the rear end of the sheet M1 reaches the reading position X2, the number of edge pixels for edge-detection is changed from the value apart from the reference pixel number V to a value approximate thereto, and the image intensity is changed from the value apart from the reference intensity to a value approximate thereto. Therefore, the CPU 31 determines that the number of edge pixels for edge-detection calculated has changed in such a way as to move into the first rear-end detection range H2 from the outside (S34 or S39: YES), and that the image intensity has changed in such a way as to move into the second rear-end detection range H3 from the outside (S35 or S40: YES). In that manner, as for the plain-paper sheet M1, while the effects of the solid color portions are reduced, the position of the rear-end image of the sheet M1 can be detected.

(In the Case of High-Quality Paper Document Sheet)

As shown in FIG. 9, the first foundation portion E4 passes through the reading position X2 after the front end of the high-quality paper sheet M2 reaches the reading position X2. The foundation portions E4 and E6 of the high-quality paper is as smooth as the opposing surface 7A of the sheet holding member 7, and approximates to the opposing surface 7A in surface roughness. Therefore, as shown in the lower area of FIG. 9, after the front end of the sheet M2 reaches the reading position X2, the number of edge pixels for edge-detection is changed from a value apart from the reference pixel number V to a value approximate thereto. Accordingly, the CPU 31 determines that the number of edge pixels for edge-detection calculated has changed in such a way as to move into the first rear-end detection range H2 from the outside of the first rear-end detection range H2 (S34 or S39: YES).

However, as shown in FIG. 2, the opposing surface 7A of the sheet holding member 7 is placed farther away from the image reading unit 6 than the position where the sheet M should be conveyed in the conveyance path R. Therefore, even if the opposing surface 7A of the sheet holding member 7 is close in color to the foundation portions E4 and E6 of the high-quality paper sheet M2, the read image of the opposing surface 7A of the sheet holding member 7 is darker than the read image of the foundation portions E4 and E6 of the high-quality paper sheet M2. That is, as shown in FIG. 10, the image intensity D3 of the foundation portions E4 and E6 of the high-quality paper is a value remote from the reference intensity D0, and is outside the second rear-end detection range H3. Therefore, the CPU 31 determines that the image intensity has not changed in such a way as to move into the second rear-end detection range H3 from the outside (S35 or S40: NO), and does not detect the position of the rear-end image.

As the front end of the solid color portion E5 reaches the reading position X2, the number of edge pixels for edge-detection is temporarily changed from a value approximate to the reference pixel value V to a value remote therefrom. Therefore, the CPU 31 determines that the number of edge pixels for edge-detection has not changed in such a way as to move into the first rear-end detection range H2 from the outside (S34 or S39: NO), and does not detect the position of the rear-end image. Immediately after that time, the number of edge pixels for edge-detection is changed from the value apart from the reference pixel number V to a value approximate thereto. Accordingly, the CPU 31 determines that the number of edge pixels for edge-detection calculated has changed in such a way as to move into the first rear-end detection range H2 from the outside (S34 or S39: YES).

However, as shown in FIG. 10, the image intensity D1 of the solid color portion E5 is vastly different from the reference intensity D0; as in the case of the image intensity D3 of the first foundation portion E4, the image intensity D1 is outside the second rear-end detection range H3. Therefore, the CPU 31 determines that the image intensity has not changed in such a way as to move into the second rear-end detection range H3 from the outside of the second rear-end detection range H3 (S35 or S40: NO), and does not detect the position of the rear-end image.

As the front end of the second foundation portion E6 reaches the reading position X2, as shown in the lower area of FIG. 9, the number of edge pixels for edge-detection is changed from a value approximate to the reference pixel number V to a value apart therefrom. Therefore, the CPU 31 determines that the number of edge pixels for edge-detection has not changed in such a way as to move into the first rear-end detection range H2 from the outside of the first rear-end detection range H2 (S34 or S39: NO), and does not detect the position of the rear-end image.

Immediately after that, the number of edge pixels for edge-detection is changed from the value apart from the reference pixel number V to a value approximate thereto. Accordingly, the CPU 31 determines that the number of edge pixels for edge-detection calculated has changed in such a way as to move into the first rear-end detection range H2 from the outside of the first rear-end detection range H2 (S34 or S39: YES).

However, as shown in FIG. 10, the image intensity D3 of the second foundation portion E6 is vastly different from the reference intensity D0, and is outside the second rear-end detection range H3. Therefore, the CPU 31 determines that the image intensity has not changed in such a way as to move into the second rear-end detection range H3 from the outside of the second rear-end detection range H3 (S35 or S40: NO), and does not detect the position of the rear-end image.

As the rear end of the sheet M1 reaches the reading position X2, as shown in the lower area of FIG. 9, the number of edge pixels for edge-detection is temporarily changed from a value approximate to the reference pixel value V to a value remote therefrom. Therefore, the CPU 31 determines that the number of edge pixels for edge-detection calculated has not changed in such a way as to move into the first rear-end detection range H2 from the outside of the first rear-end detection range H2 (S34 or S39: NO), and does not detect the position of the rear-end image.

Immediately after that, the number of edge pixels for edge-detection is changed from the value apart from the reference pixel number V to a value approximate thereto; the image intensity is changed from the value apart from the reference intensity to a value approximate thereto. Accordingly, the CPU 31 determines that the number of edge pixels for edge-detection has changed in such a way as to move into the first rear-end detection range H2 from the outside of the first rear-end detection range H2 (S34 or S39: YES), and that the image intensity has changed in such a way as to move into the second rear-end detection range H3 from the outside of the second rear-end detection range H3 (S35 or S40: YES). Accordingly, the CPU 31 detects the position of the rear end of the sheet M2. In that manner, as for the high-quality paper sheet M2, while the effects of the solid color portions are reduced, the position corresponding to the rear-end of the sheet M2 can be detected.

(Advantageous Effects of the Present Embodiment)

The plain-paper sheet M1 has the surface roughness larger than that of the opposing surface 7A of the sheet holding member 7. Therefore, it is possible to detect the position of the end image corresponding to the end of the sheet M1 in the conveying direction by determining that the number of edge pixels for edge-detection is changed between a set of line data and the subsequent set of line data. Meanwhile, the high-quality paper sheet M2 has the surface roughness similar to that of the opposing surface 7A. Therefore, it is difficult to detect the position of the end image corresponding to the end of the sheet M2 in the conveying direction by determining that the number of edge pixels for edge-detection is changed between a set of line data and the subsequent set of line data.

However, because the distance from the image reading unit 6 to the sheet M2 is different from the distance from the image reading unit 6 to the opposing surface 7A, the image intensity of the read image acquired by reading the sheet M2 is different from the image intensity of the read image acquired by reading the opposing surface 7A. Therefore, it is possible to detect the position of the end image of the sheet M2 in the conveying direction by determining that the image intensity is changed between a set of line data and the subsequent set of line data. In that manner, while the effects of the difference in surface roughness of the sheets M are suppressed, the position of the end image corresponding to the end of the sheet M on the read image can be detected.

When the number of edge pixels for edge-detection is changed between sets of line data in such a way as to move into the first rear-end detection range H2 from the outside of the first rear-end detection range H2, and when the image intensity is changed between sets of line data in such a way as to move into the second rear-end detection range H3 from the outside of the second rear-end detection range H3, the control unit 21 recognizes the position where the change has occurred on the read image as the rear end image corresponding to the rear end of the sheet M in the conveying direction. Therefore, the control unit 21 can avoid incorrectly detecting the position of a line-segment image in the read image as the position of the rear-end image.

Even when the color mode is selected, the control unit 21 performs the monochrome reading operation to detect the front end of the sheet M, and performs the color reading operation to detect the rear end of the sheet M. Therefore, it is possible to reduce a processing load and the consumed amount of a coloring agent, compared with a structure in which the color reading operation is performed even in detecting the front end of the sheet M.

Furthermore, the control unit 21 detects the edge pixels for edge-detection from one portion of the read image in the reading main scanning direction, and obtains the image intensity of the one portion. Therefore, compared with a structure in which an edge pixel for edge-detection is detected from the entire read image in the reading main scanning direction, the results of detecting the position of an end image of a sheet can be prevented from being ambiguous.

<Other Embodiments>

While the invention has been described in detail with reference to the embodiment thereof, it would be apparent to those skilled in the art that various changes and modifications may be made therein without departing from the spirit of the invention.

According to the above embodiment, the scanner 1 serving as an image reading device only includes a scanner function. However, the present invention is not limited to that configuration. The image reading device may be a multifunction machine that can perform a plurality of functions such as a copy function, along with the scanning function; or may be a facsimile machine. In the image reading device, the sheet tray may be disposed above the discharged-sheet tray.

According to the above embodiment, the control unit 21 is so configured as to execute the reading control process by using the CPU 31 and hardware circuits such as the image processing unit 34. However, the present invention is not limited to that configuration. The control unit 21 may be so configured as to execute the reading control process by using only one or a plurality of CPUs, or by using only a hardware circuit such as ASIC (Application Specific Integrated Circuit). For example, some or all of the units 35 and 36 included in the image processing unit 34 may be replaced with a CPU and memory that perform the processes of the units 35 and 36.

In the above embodiment, the image reading device includes the enhancement unit 35C configured to perform the enhancement process as a correction process. However, the image reading device may include a correction unit configured to execute any correction process other than the enhancement process. For example, the correction unit may be so configured as to perform a process of trimming, from data pertaining to the correction edge pixel, an edge portion on the line image corresponding to each set of line data as a partial image corresponding to the end of the sheet M.

The partial data that is subjected to the second edge detection process may be a part of one line image data. The one line image data is read image data corresponding to one main scanning line image extending in the main scanning direction. For example, the partial data may be an end-side portion of the read image data in the main scanning direction. For example, if the scanner 1 is of a type that conveys the sheet M in the conveyance path R with reference to the left end, it is preferred that a left-side portion of the read image data in the main scanning direction be used as the partial data. In this case, for example, even if the left-right-direction width of the sheet M is small, it is possible to set the end image corresponding to the end of the sheet M within an area on which the second edge detection process is performed, thereby detecting the position of the end image corresponding to the end portion of the sheet M. The edge detection processing unit 36 may be so configured as to perform the second edge detection process on the entire of each set of line data.

The above control unit 21 is so configured as to detect the edge pixels for edge-detection and acquire the image intensity for each single main scanning line. However, the present invention is not limited to that configuration. The control unit 21 may be so configured as to detect the edge pixels for edge-detection and acquire the image intensity for each set of a plurality of main scanning lines.

The "reference intensity" is not limited to the most frequent intensity value, and may be an average value of the image intensity of the central portion Z in the main scanning line. The control unit 21 may be configured to acquire, as the image intensity of the central portion Z, an average value of the image densities of pixels included in the central portion Z. However, compared with this configuration, the above-described embodiment is able to detect the position of the end image accurately.

The control unit 21 may be configured so as not to use the line data output from the sheet image processing unit 35 during the processes of S2 and S5, while operating the sheet image processing unit 35, and to discard the line data. Alternatively, the control unit 21 may be configured so as not to operate the sheet image processing unit 35.

The control unit 21 may be configured so as to perform the color reading operation of S2 and the monochrome reading operation of S4 only on a central region corresponding to the central portion Z in the main scanning direction.

The control unit 21 may be configured so as to perform the front-end detection process by using line data of a plurality of colors when the color mode is selected. For example, the control unit 21 may recognize the position where the change has occurred on the read image as the position of the front-end image of the sheet M (S24) when the control unit 21 performs the color reading operation at S21 and determines that, for all the colors RGB, the number of edge pixels for edge-detection calculated has changed in such a way as to move out of the front-end detection range H1 from the inside of the front-end detection range H1 (S23: NO).

The control unit 21 may be so configured as to recognize the position where the change has occurred as the position of the front-end image corresponding to the front end of a sheet M when, in the front-end detection process, the control unit 21 at least determines that the number of edge pixels for edge-detection has changed in such a way as to move out of the first front-end detection range H1 from the inside of the range H1, and determines that the image intensity has changed in such a way as to move out of the second front-end detection range from the inside of the range H2. In this configuration, since the emission direction of the light emitting unit 11 is different from the configuration of FIG. 2, the position of the front-end image can be detected on the basis of a change in image intensity even if the number of edge pixels for edge-detection of the front-end image of the sheet M is small. That is, this configuration is effective when the position of the front-end image corresponding to the end of the sheet M cannot be easily detected based on the edge pixels for edge-detection.

The control unit 21 may be so configured as to start the operation of the sheet image processing unit 35 at a time when the sheet reading process of S10 is started. The control unit 21 may be so configured as not to use the line data output from the sheet image processing unit 35, while starting operating the sheet image processing unit 35 before the start of the sheet reading process of S10, and to discard the line data.

The control unit 21 may be so configured as to proceed to S35 when the control unit 21 determines, at S34 of the rear-end detection process, that the number of edge pixels for edge-detection has changed in such a way as to move into the first rear-end detection range H2 from the outside for a predetermined number or more of colors out of the plurality of colors (e.g. half or more of the three colors), not for all the colors.

The control unit 21 may be so configured as to proceed to S36 when the control unit 21 determines, at S35 of the rear-end detection process, that the image intensity has changed in such a way as to move into the second rear-end detection range H3 from the outside for a predetermined number or more of colors out of a plurality of colors (e.g. half or more of the three colors), not for all the colors.

The control unit 21 may be so configured as to recognize a position on the read image as the position of the front-end or rear-end image when the control unit 21 determines that the position meets at least one of: condition (A) that the number of edge pixels for edge-detection is changed between a set of line data and the subsequent set of line data; and condition (B) that the image intensity is changed between the set of line data and the subsequent set of line data. Even in this configuration, it is possible to detect positions of the front-end and rear-end image corresponding to a front end and rear end of a sheet that is less affected by solid color portions or line images. Moreover, there is no need to store the reference pixel number and the reference intensity in advance.

What is claimed is:

1. An image reading device comprising:
  a conveying unit defining a conveyance path and configured to convey a sheet along the conveyance path in a conveying direction, the conveyance path including a reading position;
  an image reading unit configured to execute a reading process; and
  a control unit configured to:
  control the image reading unit to start executing the reading process before the sheet conveyed by the conveying unit reaches the reading position and to subsequently and repeatedly execute the reading process, the image reading unit acquiring a plurality of partial images successively, each of the plurality of partial images being acquired each time the image reading unit executes the reading process;
  determine, each time one partial image is acquired, a number of pixels awarded to the one partial image;
  determine, each time one partial image is acquired, an intensity awarded to the one partial image;
  judge, each time one partial image is acquired, whether or not two successively-acquired partial images satisfy at least one of: a condition (A) that the determined number of pixels is changed between the two successively-acquired partial images; and a condition (B) that the determined intensity is changed between the two successively-acquired partial images; and
  decide that at least one of the two successively-acquired partial images corresponds to an end of the sheet in the conveying direction when the two successively-acquired partial images satisfy at least one of the conditions (A) and (B).

2. The image reading device according to claim 1, further comprising an opposing member faces the image reading unit across the conveyance path, the reading position being defined between the opposing member and the image reading unit;
  wherein the control unit includes a storage unit configured to store a reference pixel number and a reference intensity, the reference pixel number being defined as a number of pixels awarded to a reference read image, the image reading unit reading the opposing member to acquire the reference read image, the reference intensity being defined as an intensity awarded to the reference read image;
  wherein the condition (A) includes a condition (C) that the determined number of the pixels is changed between the two successively-acquired partial images such that:
    a number of the pixels awarded to a firstly-acquired partial image of the two successively-acquired partial images falls outside a first reference range, the first reference range being a range of number of pixels and including the reference pixel number; and
    a number of the pixels awarded to a subsequently-acquired partial image of the two successively-acquired partial images falls within the first reference range, the another partial image being subsequent to the one partial image;
  wherein the condition (B) includes a condition (D) that the intensity is changed between the two successively-acquired partial images such that:
    an intensity awarded to a firstly-acquired partial image of the two successively-acquired partial images falls outside a second reference range, the second reference range being a range of intensity and including the reference intensity; and an intensity awarded to a subsequently-acquired partial image of the two successively-acquired partial images falls within the second reference range;

wherein the control unit judges, each time one partial image is acquired, whether or not the two successively-acquired partial images satisfy at least one of the conditions (C) and (D);

wherein the control unit decides that at least one of the two successively- acquired partial images corresponds to a trailing end of the sheet in the conveying direction when the control unit judges that the two successively-acquired partial images satisfy at least one of the conditions (C) and (D).

3. The image reading device according to claim 2, wherein the condition (A) includes a condition (E) that a number of the pixels is changed between the two successively-acquired partial images such that:

a number of the pixels for a firstly-acquired partial image of the two successively-acquired partial images falls within a third reference range, the first reference range being a range of number of pixels and including the reference pixel number; and a number of the pixels for a sequentially-acquired partial image of the two successively-acquired partial images falls outside the third reference range, the second partial image being subsequent to the first partial image;

wherein the condition (B) includes a condition (F) that the intensity is changed between the two successively-acquired partial images such that:

an intensity awarded to the firstly-acquired partial image of the two successively-acquired partial images falls within a fourth reference range, the fourth reference range being a range of intensity and including the reference intensity; and an intensity awarded to the sequentially-acquired partial image of the two successively-acquired partial images falls outside the fourth reference range;

wherein the control unit judges, each time one partial image is acquired, whether or not the two successively- acquired partial images satisfy at least one of the conditions (E) and (F);

wherein the control unit decides that at least one of the two successively-acquired partial images corresponds as a leading end of the sheet in the conveying direction when the control unit judges that the two successively-acquired partial images satisfy at least one of the conditions (E) and (F).

4. The image reading device according to claim 3, wherein the control unit judges, each time one partial image is acquired, whether or not the two successively-acquired partial images satisfy the condition (E);

wherein the control unit decides that at least one of the two successively-acquired partial images corresponds as the leading end of the sheet when the control unit judges that the two successively-acquired partial images satisfy the condition (E).

5. The image reading device according to claim 2, wherein the opposing member is disposed at a position farther away from the image reading unit than a position where a sheet should be conveyed in the conveyance path.

6. The image reading device according to claim 2, wherein the image reading unit includes:

a light source disposed below the opposing member and upstream of the opposing member in the conveyance direction, the light source configured to emit a light beam toward the opposing member; and a light receiving unit configured to receive the light beam that is emitted by the light source and is reflected by at least one of: the opposing member; and the sheet that is present at the reading position.

7. The image reading device according to claim 1, further comprising an opposing member faces the image reading unit across the conveyance path, the reading position being defined between the opposing member and the image reading unit;

wherein the control unit includes a storage unit configured to store a reference pixel number and a reference intensity, the reference pixel number being defined as a number of pixels awarded to a reference read image, the image reading unit reading the opposing member to acquire the reference read image, the reference intensity being defined as an intensity awarded to the reference read image;

wherein the condition (A) includes a condition (C) that the determined number of the pixels is changed between the two successively-acquired partial images such that:

a number of the pixels awarded to a firstly-acquired partial image of the two successively-acquired partial images falls outside a first reference range, the first reference range being a range of number of pixels and including the reference pixel number; and a number of the pixels awarded to a subsequently-acquired partial image of the two successively-acquired partial images falls within the first reference range, the another partial image being subsequent to the one partial image; wherein the condition (B) includes a condition (D) that the intensity is changed between the two successively-acquired partial images such that:

an intensity awarded to a firstly-acquired partial image of the two successively-acquired partial images falls outside a second reference range, the second reference range being a range of intensity and including the reference intensity; and an intensity awarded to a subsequently-acquired partial image of the two successively-acquired partial images falls within the second reference range;

wherein the control unit judges, each time one partial image is acquired, whether or not the two successively-acquired partial images satisfy both of the conditions (C) and (D);

wherein the control unit decides that at least one of the two successively-acquired partial images corresponds to a trailing end of the sheet in the conveying direction when the control unit judges that the two successively-acquired partial images satisfy both of the conditions (C) and (D).

8. The image reading device according to claim 1, wherein the image reading unit includes a plurality of light-emitting elements configured to emit respective light beams, the light beams that are emitted by the plurality of light-emitting elements having colors different from each other;

wherein the image reading unit is configured to selectively perform: a color reading operation in which the plurality of light-emitting elements emit the respective light beams to execute the reading process; and a monochrome reading operation in which one of the plurality of light-emitting elements emits a light beam to execute the reading process;

wherein the control unit controls the image reading unit to start executing the monochrome operation as the reading process before the sheet conveyed by the conveying unit reaches the reading position and to subsequently and repeatedly execute the monochrome operation as the reading process, the image reading unit acquiring the plurality of partial images successively, each of the plurality of partial images being acquired each time the image reading unit executes the monochrome operation;

wherein the control unit detects, each time one partial image is acquired, a number of pixels awarded to the one partial image;

wherein the control unit acquires, each time one partial image is acquired, an intensity awarded to the one partial image;

wherein the control unit judges, each time one partial image is acquired, whether or not two successively-acquired partial images satisfy at least one of the conditions (A) and (B); and wherein the control unit decides that at least one of the two successively-acquired partial images corresponds to the leading end of the sheet when the two successively-acquired partial images satisfy at least one of the conditions (A) and (B).

9. The image reading device according to claim 1, wherein the image reading unit executes the reading process to acquire a line image extending in a direction orthogonal to the conveyance direction, each of the plurality of partial images being a part of respective one line image.

10. The image reading device according to claim 1, wherein the control unit is configured to generate, each time one partial image is acquired, data representing a distribution of densities of pixels awarded to the one partial image;

wherein the control unit determines, as the intensity of the one partial image, an intensity having most frequency in the generated distribution.

11. The image reading device according to claim 1, wherein the control unit includes:
a first detecting unit configured to execute, each time one partial image is acquired, a first detection process to detect a pixel for correction from the one partial image by using a first prescribed threshold;
a correcting unit configured to correct the one partial image by using the pixel for correction; and
a second detecting unit configured to execute, each time one partial image is acquired, a second detection process to detect a pixel for detection from the one partial image by using a second prescribed threshold different from the first prescribed threshold, the control unit determining a number of the detected pixel for detection as the number of pixels awarded to the one partial image;
wherein the first detection process and the second detection process are executed in parallel.

12. The image reading device according to claim 1, wherein the control unit is further configured to:
correct, each time one partial image is acquired, the one partial image by a filter to acquire a corrected one partial image, thereby correcting a pixel value of each pixel in the one partial image to a corrected pixel value by using the filter;
determine whether or not each corrected pixel value is greater than or equal to a predetermined threshold; and
count, each time the corrected one partial image is acquired, a pixel whose corrected pixel value is greater than or equal to the predetermined threshold;
wherein the control unit determines, each time the corrected one partial image is acquired, the counted number of pixels whose corrected pixel value is greater than or equal to the predetermined threshold for the corrected one partial image being used as the number of pixels awarded to the one partial image;
wherein the control unit determines, each time the corrected one partial image is acquired, an intensity of the corrected one partial image as the intensity awarded to the one partial image;
wherein the control unit judges, each time the corrected one partial image is acquired, whether or not two successively-acquired corrected partial images satisfy at least one of: the condition (A) that the determined number of pixels is changed between the two successively-acquired corrected partial images; and the condition (B) that the determined intensity is changed between the two successively-acquired corrected partial images; and
wherein the control unit decides that at least one of the two successively-acquired corrected partial images corresponds to the end of the sheet in the conveying direction when the two successively-acquired corrected partial images satisfy at least one of the conditions (A) and (B).

13. A non-transitory computer readable storage medium storing a set of program instructions executed by a computer, the program instructions comprising:
control an image reading unit to start executing a reading process before a sheet conveyed by a conveying unit reaches a reading position of a conveying path, and to subsequently and repeatedly execute the reading process, the image reading unit acquiring a plurality of partial images successively, each of the plurality of partial images being acquired each time the image reading unit executes the reading process;
determine, each time one partial image is acquired, a number of pixels awarded to the one partial image;
determine, each time one partial image is acquired, an intensity awarded to the one partial image;
judge, each time one partial image is acquired, whether or not two successively-acquired partial images satisfy at least one of: a condition (A) that the determined number of pixels is changed between the two successively-acquired partial images; and a condition (B) that the determined intensity is changed between the two successively-acquired partial images; and
decide that at least one of the two successively-acquired partial images corresponds to an end of the sheet in the conveying direction when the two successively-acquired partial images satisfy at least one of the conditions (A) and (B).

* * * * *